United States Patent
Saija et al.

(10) Patent No.: US 6,620,881 B1
(45) Date of Patent: Sep. 16, 2003

(54) AQUEOUS POLYMER DISPERSIONS

(75) Inventors: Leo Mario Saija, Bagnolo (IT); Mario Lugli, Fabbrico (IT); Daniele Becchi, Reggio Emilia (IT)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/979,223

(22) PCT Filed: May 26, 2000

(86) PCT No.: PCT/FR00/01430

§ 371 (c)(1),
(2), (4) Date: Feb. 19, 2002

(87) PCT Pub. No.: WO00/73354

PCT Pub. Date: Dec. 7, 2000

(30) Foreign Application Priority Data

May 28, 1999 (IT) .......................................... MI99A1187

(51) Int. Cl.⁷ ................................................ C08K 3/00
(52) U.S. Cl. ...................... 524/858; 524/588; 524/558
(58) Field of Search ................................ 524/558, 858, 524/588

(56) References Cited

U.S. PATENT DOCUMENTS

| | | | | |
|---|---|---|---|---|
| 4,332,860 A | * | 6/1982 | Heins et al. ................. | 428/473 |
| 5,185,387 A | | 2/1993 | Klesse et al. ................ | 523/201 |
| 5,281,655 A | * | 1/1994 | Mitsuji et al. .............. | 524/507 |
| 5,637,409 A | * | 6/1997 | Stevens et al. ............. | 428/500 |
| 5,712,339 A | * | 1/1998 | Guerin et al. ................ | 524/515 |
| 5,723,782 A | | 3/1998 | Bolles, Jr. ..................... | 73/178 |
| 5,780,530 A | * | 7/1998 | Mizutani et al. ............ | 523/209 |
| 5,955,532 A | * | 9/1999 | Chang et al. ................ | 524/504 |
| 6,013,324 A | * | 1/2000 | Frangou et al. .......... | 427/388.4 |

FOREIGN PATENT DOCUMENTS

| | | | |
|---|---|---|---|
| EP | 0 789 082 A1 | 8/1997 | ........... C14C/11/00 |
| WO | 91/02007 | 2/1991 | ............. C08F/2/24 |
| WO | 95/13331 | 5/1995 | .......... C09J/133/00 |

OTHER PUBLICATIONS

Chemical Abstract: 127(14)192133: Preparation of Double Functional Modified Polyacrylate Emulsion as Leather Finishing Agent.

Chemical Abstract: 128(8)90271: Preparation of MS Series Acrylic Coating Resin with Inter–Penetration–Network Technology.

Cozzolino, A., *State of the Art and Possible Medium–Term Evolution of New Leather Finishing Technologies with Water–Based Solvents, Binding and Crosslinking Agents,* Anno, 68, No. 5, Sep.–Oct., 1992, pp. 503–520.

\* cited by examiner

*Primary Examiner*—David W. Wu
*Assistant Examiner*—Henry S Hu
(74) *Attorney, Agent, or Firm*—Whyte Hirschboeck Dudek SC

(57) ABSTRACT

Aqueous polymeric dispersions comprising the following constituents:

(a) from 40 to 95% by weight of one or more monomers containing an ethylenic unsaturated, the corresponding homopolymer of which has a glass transition temperature (Tg) of less than 0 ° C., (b) from 4 to 58% by weight of one or more monomers comprising an ethylenic unsaturation, the corresponding homopolymer of which has a glass transition temperature (Tg) of higher than 0° C.

(c) from 0.05 to 4% by weight of one or more monomers containing at least two ethylenic unsaturations (d) from 0.2 to 5% by weight of one or more monomers containing an unsaturation of ethylenic type and at least one functional group capable of interacting at low temperature, lower than 100° C., in the crosslinking process during the coalescence phase.

31 Claims, No Drawings

AQUEOUS POLYMER DISPERSIONS

The present invention relates to aqueous dispersions of acrylic polymers for the finishing treatment of leather.

The invention specifically relates to films obtained from aqueous dispersions of acrylic polymers which confer, on the treated leather, a very good combination of softness, elasticity, abrasion-resistance, both dry and wet, resistance to water and to solvents, very good print acceptance and good adhesion to the leather substrate.

It is known, from the prior art, that the technique of finishing a leather, known as finishing, involves the use of polymer binders which are capable of forming films, which have suitable mechanical properties and which are characterized by good adhesion to the substrate. After the drying operation, the polymer film must achieve a degree of crosslinking capable of conferring, on the treated leather, characteristics of softness, of elasticity and of abrasion-resistance. This feature is particularly important in the case of leathers (splits) subjected to pressing and molding operations. In this case, it is necessary for the polymer film to withstand the print action, namely for it not to exhibit cracks and for it to be, at the same time, sufficiently plastic to retain the desired print profiles.

In the prior art, twin-component systems are used to achieve this very good combination of properties. For example, use may be made of functionalized acrylic dispersions, polyurethane dispersions, and the like, in combination with crosslinking agents, such as, for example, polyaziridines, polycarbodiimides, poly-isocyanates, and the like. The polyurethane dispersions give a very good combination of properties to the end manufactured article but exhibit the disadvantage of being too expensive. In the twin-component systems, the crosslinking agents react, generally at room temperature at the time of the formation of the film, with the functional groups present in the dispersed polymer chains. The use of twin-component systems results in the disadvantage of a very limited pot life, once the components have been mixed. Furthermore, it is necessary to stress the very high toxicity of some crosslinking agents, for example polyaziridines. These twin-component systems are described, for example, in the article in the scientific review "Hide Leathers Tanning Materials", Year 68, No. 5, Sep.–Oct. 1992, entitled "Prior art and possible medium-term developments of new leather finishing technologies, in particular with water-based solvents", by A. Cozzolino, pages 503–520.

An alternative to the twin-component systems in the prior art is composed of commercially available self-crosslinkable dispersions, in which the crosslinking takes place via functional groups already present in the polymer chains interacting during the phase of coalescence of the dispersion. Acrylic dispersions functionalized with N-methylolacrylamide (NMA) can be mentioned as example. The disadvantage of these dispersions is that they require a high temperature, of greater than 100° C., in order for the crosslinking to be completed within times which are acceptable industrially. See Chemical Abstracts, 127 192133f, "Preparation of an emulsion of modified polyacrylate comprising two functionalities as leather finishing agent"; Chemical Abstracts, 128 90271c, "Preparation of an acrylic coating resin of the MS series with interpenetrating network technology".

Other self-crosslinkable dispersions are those comprising divalent metals, for example transition metals, disclosed in EP 789 082 and U.S. Pat. No. 5,723,782. The disadvantage of these dispersions is that they comprise a concentration of heavy metals which is often incompatible with the laws of some countries.

Self-crosslinkable aqueous dispersions based on acrylic polymers functionalized with a (meth)acrolein are also known. These dispersions are those which are the most readily used on the market, given that they make it possible to obtain polymer films characterized by a good compromise between mechanical properties, the resistance to solvents and the absence of stickiness. Even if, from the viewpoint of the final user, they do not exhibit a problem of a toxicological nature, the systems based on (meth)acrolein are difficult to handle for the producer of the polymer dispersion. (Meth)acrolein indeed exhibits the disadvantage of being a highly reactive, volatile and extremely toxic monomer, which results in problems from the viewpoint of transportation and handling.

The need was felt to have available self-crosslinkable aqueous dispersions which do not imply, for the producer of the dispersions, the disadvantages mentioned above of the (meth)acrolein-based systems but which confer, on the treated leather, a very good combination of softness, elasticity, abrasion-resistance, both dry and wet, resistance to water and to solvents, very good print acceptance and good adhesion to the leather substrate.

One object of the present invention is thus aqueous dispersions of polymers comprising the following constituents, a) from 40 to 95% by weight of one or more monomers comprising an ethylenic unsaturation, the corresponding homopolymer of which has a glass transition temperature ($T_g$) of less than 0° C., preferably of less than −20° C.; the constituent a) also optionally comprising the monomers comprising the functional group defined in d), in a proportion of 20–50% by weight with respect to the amount defined in d);

b) from 4 to 58% by weight of one or more monomers comprising an ethylenic unsaturation, the corresponding homopolymer of which has a $T_g$ of greater than 0° C., preferably of greater than 40° C.; (meth)acrolein being excluded from the constituent b), optionally also comprising the monomers comprising the functional groups defined in d), in a proportion of 20–50% by weight with respect to the amount defined in d);

c) from 0.05 to 4% by weight of one or more monomers comprising at least two ethylenic unsaturations;

d) from 0.2 to 5%, preferably 0.5–3%, by weight of one or more monomers comprising an unsaturation of ethylenic type and at least one functional group capable of interacting at low temperature, lower than 100° C., in the crosslinking process in the coalescence phase, (meth)acrolein and acrylonitrile being excluded from the constituent d).

Preferably, the dispersions of the invention comprise the following constituents:

a) from 40 to 95% by weight of one or more monomers comprising an ethylenic unsaturation, the corresponding homopolymer of which has a glass transition temperature ($T_g$) of less than 0° C., preferably of less than −20° C.; the monomers comprising the functional groups defined in d) being excluded from the constituent a);

b) from 4 to 58% by weight of one or more monomers comprising an ethylenic unsaturation, the corresponding homopolymer of which has a $T_g$ of greater than 0° C., preferably of greater than 40° C.; (meth)acrolein and the monomers comprising the functional groups defined in d) being excluded from the constituent b);

c) from 0.05 to 2% by weight of one or more monomers comprising at least two ethylenic unsaturations;

d) from 0.2 to 5%, preferably 0.5–3%, by weight of one or more monomers comprising an unsaturation of ethylenic type and at least one functional group capable of interacting at low temperature (lower than 100° C.) in the crosslinking process in the coalescence phase, (meth)acrolein and acrylonitrile being excluded from the constituent d).

Preferably, in the dispersions of the invention, the constituent d) is added after approximately two thirds of the polymerization of the constituents a)+b)+c) with respect to the total of a)+b)+c).

Use may be made, as constituent a), of monomers of (meth)acrylic or vinyl type, and the like. Generally, the monomers of the constituent a) have from 4 to 20 carbon atoms, preferably from 5 to 15 carbon atoms. Acrylic or methacrylic esters, for example ethyl acrylate, butyl acrylate or 2-ethylhexyl (meth)acrylate, can be mentioned, for example.

Use may be made, as constituent b), of monomers of (meth)acrylic or vinyl type, and the like. Generally, the monomers of the constituent b) have from 3 to 20 carbon atoms, preferably from 3 to 10 carbon atoms. Acrylic or methacrylic esters, preferably methyl methacrylate or ethyl methacrylate, acrylonitrile, styrene or vinyl acetate can be mentioned.

Use may be made, as constituent c), of monomers comprising two ethylenic unsaturations of acrylic, vinyl or allyl type, such as, for example, allyl methacrylate or ethylene glycol di(meth)acrylate (EGD(M)A); monomers comprising more than two unsaturations of the abovementioned type are those which are preferred as constituent c), for example, trimethylolpropane tri(meth)acrylate (TMPTA).

Use may be made, as constituent d), of monomers comprising an unsaturation of ethylenic type and at least one functional group capable of interacting in the crosslinking process in the coalescence phase with the formation of covalent bonds or hydrogen bonds, preferably covalent bonds. The functional groups may be identical to or different from one another and mention may be made of the hydroxyl, amide, silane, amine and epoxide groups and the like. Mention may be made, for example, of (meth)acrylamide, hydroxyethyl (meth)acrylate, glycidyl (meth)acrylate or unsaturated silane compounds, such as, for example, alkoxysilanes, preferably comprising an unsaturation of vinyl type, where the alkoxyalkyl radical has from 1 to 10 carbon atoms, preferably more than 2. Use is made, as preferred monomers d), of those capable of giving covalent bonds, optionally in the presence of monomers capable of giving hydrogen bonds.

Use is preferably made, as constituent d), of a monomer of silane type as defined. If desired, the monomer of silane type can also be added to a combination of monomers having a different functional group.

The preferred dispersions of the invention comprise from 60 to 90% by weight of the constituent a), from 5 to 30% of the constituent b), from 0.5 to 1.5% by weight of the constituent c) and from 0.5 to 4% of the constituent d).

The dispersions of the present invention are obtained by a radical polymerization process of semicontinuous type, in aqueous emulsion, in which process a part of the monomer preemulsion prepared previously is introduced into the reactor at the beginning of the polymerization, while the remaining part of the preemulsion is subsequently introduced immediately after the exothermic peak. Generally, the exothermic peak appears after 5–20 minutes.

A preferred process for obtaining the dispersions of the invention comprises the preparation of a preemulsion composed of the constituents a)+b)+c), the introduction of 2–10% by weight of this preemulsion into the polymerization reactor to initiate the reaction; at the exothermic peak, the remainder of the preemulsion of a)+b)+c) is introduced at a constant flow rate within the space of 2 to 5 hours up to ⅔ of the final total amount; at the end, the remaining part of the preemulsion of a)+b)+c), enriched in constituent d) in the concentrations defined above, is introduced within the space of 30 minutes to approximately 2.5 hours. The feed times are, however, such that the temperature in the polymerization reactor is maintained at a predefined value.

An even more preferred process for obtaining the dispersions of the invention consists, after the initiation of the reaction with a preemulsion composed of the constituents a)+b)+c), of a sequential polymerization, first of a preemulsion of a)+b)+c) and then of a preemulsion of a)+b)+d), the preemulsions having the same ratio of the constituents a)/b); the amount by weight of the first preemulsion of a)+b)+c) representing ¾ of the total amount of the two preemulsions and, the amount by weight of the second preemulsion of a)+b)+d) representing ¼ of the total amount of the two preemulsions.

The initiator systems are those known in the prior art for the radical polymerization of monomers in aqueous emulsion. Mention may preferably be made of t-butyl hydroperoxide and/or persulfate salts, alone or in combination with metabisulfite salts and/or iron salts, or sodium formaldehydesulfoxylate.

The preparation of the abovementioned preemulsions is carried out with known processes, by virtue of the use of surfactants. Mention may be made, for example, of anionic surfactants, such as alkali metal salts of alkanesulfonates, for example sodium lauryl sulfate; nonionic surfactants, such as ethoxylated alkylphenols, for example nonylphenol ethoxylated with 20 mol of ethylene oxide, or ethyoxylated fatty alcohols, for example $C_{12}$–$C_{14}$ fatty alcohols ethoxylated with 30 mol of ethylene oxide.

The polymer dispersion of the invention can be stabilized, if necessary, with the surfactants mentioned for the preparation of the preemulsions, preferably nonionic surfactants.

The polymerization temperatures used are preferably within the range from 30°–80° C.

When the polymerization is complete, the aqueous dispersions of the present invention in the latex form are characterized from a physicochemical viewpoint (see the examples); they are subsequently dried to give polymer films intended for the physicochemical characterization (see the examples).

As has been said, the dispersions of the invention are particularly useful in the preparation of formulations for use in the finishing treatment of leather with the optimum combination of the abovementioned properties.

The following examples are presented by way of illustration but are not limitations on the scope of the invention.

EXAMPLES

Characterization

The polymer films, obtained by drying the dispersion in suitable PTFE vessels, were subjected to physicochemical characterization after conditioning for 7 days in a controlled environment at a relative humidity of 50% and a temperature of 23° C.

The main tests carried out are the measurement of maximum load, of elongation at break, of elastic return with static loads, of Shore A hardness and of water, ethyl alcohol and acetone absorption. These parameters were chosen, given that they are directly related to the conditions of use of the product.

The determination of the maximum stress and of elongation at break was carried out according to the DIN 53455 method, with a test specimen of R type and a tensioning rate of 300 mm/min.

The determination of the elastic return with a static load was carried out according to the ASTM D412 method. Test specimens of type 5, mentioned in DIN 53455, stretched to 400% ($I_a$) with respect to their initial length ($I_i$), were kept stretched for 8 hours and then they were left to freely return, in a vertical position, to their initial shape over a period of 16 hours, at the end of which the final length ($I_f$) of the test specimens was measured. The elastic return ER is expressed in the following way:

$$ER=(I_a-I_f)/(I_a-I_i)\times 100$$

The determination of the water, ethanol and acetone absorptions was carried out by immersion of test specimens with dimensions of 2 cm×2 cm and a weight of approximately 1 g in the appropriate solvent.

The test specimens were weighed before being immersed and weighed again after a period of 7 days for the solvent water and 8 hours for the other solvents, after the liquid possibly present on their surfaces had been removed with blotting paper.

Characterization of the finishes obtained

The finishing treatment is carried out on calfskins (splits) using a formulation based on a polymer dispersion with the following formula:

TABLE 1

| Constituent | Parts by weight |
| --- | --- |
| Emulsified waxes | 15.00 |
| Pigment | 15.00 |
| Polymer dispersion (50% solid matter) | 60.00 |
| Water | 10.00 |

The formulation is applied by spraying, in such a way that, after drying for 10 minutes at 60° C., it gives an amount of 200–250 g/m². The leather is subsequently subjected to a printing process at a temperature of approximately 90° C., under a pressure of 300 atm and for a contact time of approximately 5 seconds. The printed leather is subsequently finished with a thin layer based on nitrocellulose.

Acceptance of the printing

The quality of the printing process is evaluated by monitoring the resistance of a formulation to cracking in the printing process, the definition and the retention of the printed design. The result is expressed on a scale from 1 to 5, where 5 indicates the complete absence of microcracks and very good retention of the impression, whereas 1 means a completely cracked finish and/or the absence of retention of the impression.

Stickiness

The stickiness is evaluated by observing the readiness with which the finished leather becomes detached from the hot plate of the press. The result is expressed on a scale from 1 to 3, where 3 indicates the absence of stickiness and the ease of release from the plate, whereas 1 means a very sticky finish which is difficult to detach from the plate.

Dry flex behavior

Use is made, in determining the dry flex behavior of leathers finished with the formulations obtained from the polymer dispersions of the invention, of a Bally flexometer according to the process based on the IUF 20 standard of the International Union of Leather Technologists and Chemists Societies. The test specimens (65×40 mm) are subjected to bending movements and examined after a certain number of cycles. The test is interrupted at the number of cycles where 10 or more cracks have appeared in the finish. Even though the extent of the damage depends on the type of leather used in the test, a resistance equal to approximately 10 000 bending movements is regarded as acceptable.

Wet rub resistance

The Veslic C4500 method is used to determine the wet rub resistances of the finished leathers. Dry leather test specimens with dimensions of 115×38 mm are abraded with a moist felt wad loaded with a pressure of 1 kg/cm². The number of cycles necessary to transfer a slight coloring to the wad is recorded.

Resistance to the solvents

The determination of the resistance of the finish to acetone and nitro solvents is carried out by observing the behavior after contact with a drop of solvent. The result is expressed on a scale from 1 to 3, where 3 indicates a completely unchanged finish and 1 indicates a dissolved or removed finish.

EXAMPLE 1 (Comparative)

1 355 g of demineralized water and 4.3 g of sodium lauryl sulfate are introduced into a glass reactor equipped with a reflux condenser, a stirrer, a temperature-regulating system and a nitrogen inlet. An emulsion composed of 1 765 g of demineralized water, 18 g of sodium lauryl sulfate, 3 185 g of n-butyl acrylate, 540 g of acrylonitrile, 77 g of methacrylic acid and 38 g of acrolein is prepared in another vessel equipped with a stirrer (preemulsifier). When the temperature in the reactor reaches 50° C., 300 g of the monomer preemulsion prepared previously are introduced therein and 19 g of sodium persulfate, dissolved in 130 g of demineralized water, 24 mg of ferrous sulfate, dissolved in 5 g of demineralized water, and 0.4 g of sodium metabisulfite, dissolved in 5 g of demineralized water, are added thereto successively.

When initiation has begun, the temperature inside the reactor rises by approximately 10° C. (exothermic peak). One minute after having reached the exothermic peak, the remaining part of the monomer emulsion is added to the contents of the reactor at a constant flow rate over a period of time of 4 hours, along with 3.45 g of sodium metabisulfite diluted with 157 g of demineralized water, care being taken to maintain the contents of the reactor, throughout the duration of the feeding, at a temperature of 60° C.. When feeding is complete, the reactor is maintained at a temperature of 60° C. for half an hour and then 4.5 g of t-butyl hydroperoxide, dissolved in 28 g of demineralized water, and 3.4 g of sodium formaldehydesulfoxylate, dissolved in 80 g of water, are added at a constant flow rate within the space of 75 minutes. The reaction mixture is maintained at 60° C. for a further half an hour, after which it is cooled to a temperature of 35° C. and 19 g of triethylamine, 18 g of 28 Bé aqueous ammonia and 110 g of demineralized water are added and then cooling is continued to room temperature. The dispersion thus obtained, filtered through a 36 mesh sieve, is characterized by a dry residue of 50% (1 h at 105° C.), a pH of 7.0, a precoagulum content of less than 200 ppm and a viscosity (Brookfield RVT at 100 revolutions/min and 23° C.) of 110 mPa.s.

EXAMPLE 2 (Comparative)

The polymerization according to Example 1 is repeated, adding, to the monomer preemulsion, instead of acrolein, an equivalent molar amount of acrylamide.

EXAMPLE 3

1 355g of demineralized water and 4.3 g of sodium lauryl sulfate are introduced into a reactor of the type described in Example 1. An emulsion composed of 1 765 g of demineralized water, 18 g of sodium lauryl sulfate, 3 185 g of n-butyl acrylate (constituent a), 540 g of acrylonitrile (constituent b), 77 g of methacrylic acid (constituent b), 29 g of trimethylolpropane triacrylate (constituent c) and 64 g of acrylamide (constituent d) is prepared in another vessel equipped with a stirrer (preemulsifier).

When the contents of the reactor reach a temperature of 50° C., 300 g of the monomer preemulsion prepared beforehand are introduced therein and 19 g of sodium persulfate, dissolved in 130 g of demineralized water, 24 mg of ferrous sulfate, dissolved in 5 g of demineralized water, and 0.4 g of sodium metabisulfite, dissolved in 5 g of demineralized water, are added thereto successively.

When initiation has begun, the temperature inside the reactor rises by approximately 10° C. (exothermic peak). One minute after having reached the exothermic peak, the remaining part of the monomer emulsion is added to the contents of the reactor at a constant flow rate over a period of 4 hours, along with 3.45 g of sodium metabisulfite diluted with 157 g of demineralized water, care being taken to keep the contents of the reactor at a temperature of 60° C. throughout the duration of the feeding. When the feeding of the remaining preemulsion is complete, the contents of the reactor are maintained at a temperature of 60° C. for half an hour and then 4.5 g of t-butyl hydroperoxide, dissolved in 28 g of demineralized water, and 3.4 g of sodium formaldehydesulfoxylate, dissolved in 80 g of water, are added at a constant flow rate within the space of 75 minutes. The reaction mixture is maintained at 60° C. for a further half an hour, then it is cooled to a temperature of 35° C. and 36 g of 28% aqueous ammonia and 110 g of demineralized water are added, and then cooling is continued to ambient temperature.

The dispersion thus obtained, filtered through a 36 mesh sieve, is characterized by a dry residue of 49.6% (1 h at 105° C.), a pH of 7.2, a precoagulum content of less than 200 ppm and a viscosity (Brookfield RVT at 100 revolutions/min and 23° C.) of 200 mPa.s

EXAMPLE 4

The polymerization of Example 3 is repeated, the amount of trimethylolpropane triacrylate (constituent c) being increased to 44 g.

The dispersion thus obtained, filtered through a 36 mesh sieve, is characterized by a dry residue of 50.2% (1 h at 105° C.), a pH of 7.1, a precoagulum content of less than 200 ppm and a viscosity (Brookfield RVT at 100 revolutions/min and 23° C.) of 180 mPa.s

EXAMPLE 5

1 355g of demineralized water and 4.3 g of sodium lauryl sulfate are introduced into a reactor of the type described in Example 1. An emulsion composed of 1 830 g of demineralized water, 18 g of sodium lauryl sulfate, 3 185 g of n-butyl acrylate (constituent a), 540 g of acrylonitrile (constituent b), 77 g of methacrylic acid (constituent b) and 22 g of trimethylolpropane triacrylate (constituent c) is prepared in another vessel equipped with a stirrer (preemulsifier). When the contents of the reactor reach a temperature of 50° C., 300 g of the monomer preemulsion prepared beforehand are introduced therein and 19 g of sodium persulfate, dissolved in 130 g of demineralized water, 24 mg of ferrous sulfate, dissolved in 5 g of demineralized water, and 0.4 g of sodium metabisulfite, dissolved in 5 g of demineralized water, are added thereto successively.

When initiation has begun, the temperature inside the reactor rises by approximately 10° C. One minute after having reached the maximum temperature, the remaining part of the monomeremulsion is added to the contents of the reactor at a constant flow rate over a period of 4 hours, along with 3.45 g of sodium metabisulfite diluted with 157 g of demineralized water, care being taken to keep the contents of the reactor at a temperature of 60° C. throughout the duration of the feeding. Two and a half hours after the beginning of the feeding, 38 g of triisopropoxyvinylsilane (constituent d) are added. When the feeding of the remaining preemulsion is complete, the contents of the reactor are maintained at a temperature of 60° C. for half an hour and then 4.5 g of t-butyl hydroperoxide, dissolved in 28 g of demineralized water, and 3.4 g of sodium formaldehydesulfoxylate, dissolved in 80 g of water, are added at a constant flow rate within the space of 75 minutes. The reaction mixture is maintained at 60° C. for a further half an hour, after which it is cooled to a temperature of 35° C. and 36 g of 28% aqueous ammonia and 110 g of demineralized water are added, and then cooling is continued to room temperature.

The dispersion thus obtained, filtered through a 36 mesh sieve, is characterized by a dry residue of 50% (1 h at 105° C.), a pH of 6.7, a precoagulum content of less than 200 ppm and a viscosity (Brookfield RVT at 100 revolutions/min and 23° C.) of 70 mpa.s.

EXAMPLE 6

1 355 g of demineralized water and 4.3 g of sodium lauryl sulfate are introduced into a reactor of the type described in Example 1. An emulsion composed of 1 765 g of demineralized water, 18 g of sodium lauryl sulfate, 3 185 g of n-butyl acrylate (constituent a), 540 g of acrylonitrile (constituent b), 77 g of methacrylic acid (constituent b) and 2 g of ethylene glycol dimethacrylate (constituent c) is prepared in another vessel equipped with a stirrer (preemulsifier). When the entire contents of the reactor have reached a temperature of 50° C., 300 g of the monomer preemulsion prepared beforehand are introduced therein and 19 g of sodium persulfate, dissolved in 130 g of demineralized water, 24 mg of ferrous sulfate, dissolved in 5 g of demineralized water, and 0.4 g of sodium metabisulfite, dissolved in 5 g of demineralized water, are added thereto successively.

When the feeding is complete, 76 g of triisopropoxyvinylsilane (constituent d) are added to the monomer emulsion.

When initiation has begun, the temperature inside the reactor rises by approximately 10° C. One minute after having reached the maximum temperature, the remaining part of the monomer emulsion is added to the contents of the reactor at a constant flow rate over a period of 4 hours, along with 3.45 g of sodium metabisulfite diluted with 157 g of demineralized water, care being taken to keep the contents of the reactor at a temperature of 60° C. throughout the duration of the feeding. When the feeding of the remaining preemulsion is complete, the contents of the reactor are maintained at a temperature of 60° C. for half an hour and then 4.5 g of t-butyl hydroperoxide, dissolved in 28 g of demineralized water, and 3.4 g of sodium formaldehydesulfoxylate, dissolved in 80 g of water, are added at a constant flow rate within the space of 75 minutes. The reaction mixture is maintained at 60° C. for a further half an hour, after which it is cooled to a temperature of 35° C. and 36 g of 28% aqueous ammonia and 110 g of demineralized water are added, and then cooling is continued to room temperature.

The dispersion thus obtained, filtered through a 36 mesh sieve, is characterized by a dry residue of 49.8% (1 h at 105° C.), a pH of 7.2, a precoagulum content of less than 200 ppm and a viscosity (Brookfield RVT at 100 revolutions/min and 23° C.) of 140 mPa.s.

EXAMPLE 7

The reaction is carried out by successively polymerizing two preemulsions having the same ratio of the constituents a)/b) but respectively comprising the constituent c) and the constituent d) of Example 5. The ratio of the preemulsion I to the preemulsion II is equal to 3:1.

1 345g of demineralized water and 4.3 g of sodium lauryl sulfate are introduced into a reactor of the type described in Example 1. A preemulsion I composed of 1 190 g of demineralized water, 13.5 g of sodium lauryl sulfate, 2 387 g of n-butyl acrylate (constituent a), 404 g of acrylonitrile (constituent b), 58 g of methacrylic acid (constituent b) and 29 g of trimethylolpropane triacrylate (constituent c) is prepared in another vessel. A preemulsion II composed of 395 g of demineralized water, 4.5 g of sodium lauryl sulfate, 796 g of n-butyl acrylate (constituent a), 134 g of acrylonitrile (constituent b), 19 g of methacrylic acid (constituent b) and 28.7 g of triisopropoxyvinylsilane (constituent d) is prepared separately in a third vessel. When the contents of the reactor reach a temperature of 50° C., 300 g of preemulsion I prepared beforehand are introduced therein and 19 g of sodium persulfate, dissolved in 130 g of demineralized water, 24 mg of ferrous sulfate, dissolved in 5 g of demineralized water, and 0.4 g of sodium metabisulfite, dissolved in 5 g of demineralized water, are added successively.

When initiation has begun, the temperature inside the reactor rises by approximately 10° C. One minute after having reached the maximum temperature, the remaining part of preemulsion I is added to the contents of the reactor at a constant flow rate over a period of 3 hours, along with 2.59 g of sodium metabisulfite dissolved in 118 g of demineralized water, care being taken to keep the contents of the reactor at a temperature of 60° C. throughout the duration of the feeding. When the feeding of preemulsion I is complete, the feeding of preemulsion II is begun over one hour, at the same time as 0.86 g of Na metabisulfite dissolved in 39 g of water. When the feeding of preemulsion II is complete, the reactor is maintained at a temperature of 60° C. for half an hour and then 4.5 g of t-butyl hydroperoxide, dissolved in 28 g of demineralized water, and 3.4 g of sodium formaldehydesulfoxylate, dissolved in 80 g of water, are added at a constant flow rate within the space of 75 minutes. The reaction mixture is maintained at 60° C. for a further half an hour, after which it is cooled to a temperature of 35° C. and 36 g of 28% aqueous ammonia and 110 g of demineralized water are added, and then cooling is continued to room temperature.

The dispersion thus obtained, filtered through a 36 mesh sieve, is characterized by a dry residue of 50% (1 h at 105° C.), a pH of 7.5, a precoagulum content of less than 200 ppm (over a 275 mesh screen) and a viscosity (Brookfield RVT at 100 revolutions/min and 23° C.) of 130 mPa.s.

The mechanical characteristics of the polymer films obtained and their absorption in water, ethanol and acetone are presented in Table 2. The results of the application tests on leather are combined in Table 3.

TABLE 2

| Example | Tensile strength (N/mm$^2$) | Elongation at break (%) | Tension set at 400% (%) | Shore A Hardness | Absorption of water at 7 days (%) | Absorption of ethanol at 8 h (%) | Absorption of acetone at 8 h (%) |
| --- | --- | --- | --- | --- | --- | --- | --- |
| 1 (comp.) | 1.8 | 600 | 96 | 16 | 36 | 53 | 580 |
| 2 (comp.) | 2.8 | 910 | 71 | 21 | 40 | 62 | dissolved |
| 3 | 3.0 | 600 | 90 | 26 | 60 | 62 | swollen |
| 4 | 3.7 | 370 | break | 30 | 52 | 52 | swollen |
| 5 | 2.5 | 890 | 94 | 18 | 17 | 59 | 880 |
| 6 | 3.7 | 560 | 97 | 23 | 33 | 54 | 440 |
| 7 | 2.5 | 940 | 94 | 18 | 20 | 55 | 750 |

TABLE 3

| Example | Acceptance of printing | Stickiness | Wet Veslic Number of cycles | Dry Bally Number of bending movements | Resistance to acetone | Resistance to nitro solvent |
| --- | --- | --- | --- | --- | --- | --- |
| 1 (comp.) | 3 | 2 | 130 | 17000 | 1 | ⅔ |
| 2 (comp.) | 1 | 3 | 20 | 2000 | 1 | 1 |
| 3 | 2 | 3 | 40 | 5000 | 2 | 1 |
| 4 | 5 | 3 | 40 | 4000 | 3 | 1 |
| 5 | ¾ | 2 | 140 | 20000 | 3 | 3 |
| 6 | 3 | 2 | 80 | 6000 | 1 | 3 |
| 7 | ¾ | 2 | 160 | 20000 | 3 | 3 |

What is claimed is:

1. An aqueous dispersion of polymers, the polymers comprising the following constitutents:
   a) from 40 to 95% by weight of one or more monomers comprising an ethylenic unsaturation, the corresponding homopolymer of which has a glass transition temperature ($T_g$) of less than 0° C., the constituent a) also optionally comprising the monomers comprising the functional groups defined in d), in a proportion of 20–50% by weight with respect to the amount defined in d);
   b) from 4 to 58% by weight of one or more monomers comprising an ethylenic unsaturation, the corresponding homopolymer of which has a $T_g$ of greater than 0° C., (meth)acrolein being excluded from the constituent b), optionally also comprising the monomers comprising the functional groups defined in d), in a proportion of 20–50% by weight with respect to the amount defined in d);
   c) from 0.05 to 4% by weight of one or more monomers comprising at least two ethylenic unsaturations;
   d) from 0.2 to 5%, by weight of one or more monomers comprising an unsaturation of ethylenic type and at least one functional group capable of interacting at a temperature lower than 100° C., in a crosslinking process in the coalescence phase, the monomer d) being selected from unsaturated silane compounds.

2. The aqueous dispersion of polymers as claimed in claim 1, comprising the following constituents:
   a) from 40 to 95% by weight of one or more monomers comprising an ethylenic unsaturation, the corresponding homopolymer of which has a glass transition temperature ($T_g$) of less than 0° C., the monomers comprising the functional groups defined in d) being excluded from the constituent a);
   b) from 4 to 58% by weight of one or more monomers comprising an ethylenic unsaturation, the corresponding homopolymer of which as a $T_g$ of greater than 0° C., (meth)acrolein and the monomers comprising the functional groups defined in d) being excluded from the constituent b);
   c) from 0.05 to 4% by weight of one or more monomers comprising at least two ethylenic unsaturations;
   d) from 0.2 to 5%, by weight of one or more monomers comprising an unsaturation of ethylenic type and at least one functional group capable of interacting at a temperature lower than 100° C. in a crosslinking process in the coalescence phase, the monomer d) being selected from unsaturated silane.

3. The aqueous dispersion of polymers as claimed in claim 1, obtained by a process in which the constituent d) is added after approximately two thirds of the polymerization of the constituents a)+b)+c) with respect to the total of a)+b)+c).

4. The aqueous dispersion of polymers as claimed in claim 1, in which the constituent a) is chosen from monomers of (meth)acrylic or vinyl type, having from 4 to 20 carbon atoms.

5. The aqueous dispersion of polymers as claimed in claim 4, in which the constituent a) is chosen from acrylic or methacrylic esters.

6. The aqueous dispersion of polymers as claimed in claim 1, in which the constituent b) is chosen from monomers of (meth)acrylic or vinyl type, having from 3 to 20 carbon atoms.

7. The aqueous dispersion of polymers as claimed in claim 6, in which the constituent b) is chosen from acrylic or methacrylic esters.

8. The aqueous dispersion of polymers as claimed in claim 1, in which the constituent c) is chosen from monomers comprising two ethylenic unsaturations of acrylic, vinyl or allyl type; or monomers comprising more than two unsaturations of the above mentioned type.

9. The aqueous dispersion of polymers as claimed in claim 1 comprising from 60 to 90% by weight of the constituent a), from 5 to 30% of the constituent b), from 0.5 to 1 5% by weight of the constituent c) and from 0.5 to 4% of the constituent d).

10. A process for the preparation of the aqueous dispersion of polymers as claimed in claim 1, in which the polymerization is of radical type and the polymerization has an exothermic peak, in aqueous emulsion, the process comprising the steps of:
    introducing a part of a monomer preemulsion into a reactor to initiate the polymerization; and
    introducing the remaining part of the preemulsion immediately after the exothermic peak.

11. The process as claimed in claim 10, comprising the steps of:
    preparing a preemulsion composed of the constituents a)+b)+c);
    2–10% by weight of which are introduced into the polymerization reactor to initiate the reaction;
    introducing more of the preemulsion to the reactor at the exothermic peak, wherein the preemulsion of a)+b)+c) is introduced at a constant flow rate to deliver up to ⅔ of the final total amount; and
    at the end, introducing the remaining part of the preemiulsion of a)+b)+c), enriched in constituent d), to the reactor.

12. The process as claimed in claim 10, comprising, after the initiation of the reaction with a preemulsion composed of the constituents a)+b)+c), the following sequential polymerization steps;
    first polymerizing a preermulsion of a)+b)+c); and
    then polymerizing a preemulsion of a)+b)+d),
    wherein (i) the preemulsions have the same ratio of the constituents a)/b); and (ii) the amount by weight of the first preemulsion of a)+b)+c) representing ¾ of the total amount of the two preemulsions and the amount by weight of the second preemulsion of a)+b)+d) representing ¼ of the total amount of the two preemulsions.

13. The process as claimed in claim 10, in which the dispersion is stabilized with surfactants as used in the preparation of the preemulsions.

14. A finishing treatment composition for leather comprising the aqueous dispersion of polymers as claimed in claim 1.

15. The dispersion of claim 1 wherein the corresponding homopolymer of nonomer a) has a Tg of less than −20° C.

16. The dispersion of claim 1 wherein the corresponding homopolymer of monomer b) has a Tg of more than 40° C.

17. The dispersion of claim 1 wherein constituent d) is present in an amount from 0.5–3% by weight.

18. The dispersion of claim 2 wherein the corresponding homopolymer of monomer a) has a Tg of less than −20° C.

19. The dispersion of claim 2 wherein the corresponding homopolymer of monomer b) has a Tg of more than 40° C.

20. The dispersion of claim 2 wherein constituent d) is present in an amount from 0.5–3% by weight.

21. The dispersion of claim 4 wherein the monomers of (meth) acrylic or vinyl type have from 5 to 15 carbon atoms.

22. The dispersion of claim 5 wherein the acrylic or methacrylic esters are selected from the group consisting of ethyl acrylate, butyl acrylate and 2-ethyl hexyl(meth) acrylate.

23. The dispersion of claim 6 wherein the monomers have from 3 to 10 carbon atoms.

24. The dispersion of claim 7 wherein constituent b) is selected from the group consisting of methyl methacrylate, ethyl methacrylate, acrylonitrile, styrene and vinyl acetate.

25. The dispersion of claim 8 wherein constituents c) is selected from the group consisting of allyl methacrylate, ethylene glycol di(meth) acrylate and trimethylol propane tri(meth) acrylate.

26. The dispersion of claim 1, wherein the unsaturated silane monomer is an alkoxysilane.

27. The dispersion of claim 26, wherein the unsaturation is of vinyl type.

28. The process of claim 10, wherein the dispersion is stabilized by nonionic surfactants.

29. A finishing treatment for leather comprising applying the aqueous dispersion of polymers as claim 1 to leather.

30. A finishing treatment for leather as claimed in claim 28 wherein the leather in splits is subjected to pressing and molding operations.

31. A treated leather split obtained according to the finishing treatment as defined in claim 30.

* * * * *

UNITED STATES PATENT AND TRADEMARK OFFICE
CERTIFICATE OF CORRECTION

PATENT NO. : 6,620,881 B1
DATED : September 16, 2003
INVENTOR(S) : Leo Mario Saija et al.

It is certified that error appears in the above-identified patent and that said Letters Patent is hereby corrected as shown below:

<u>Column 12,</u>
Line 9, replace "1 5%" with -- 1.5% --.
Line 55, replace "nonomer" with -- monomer --.

Signed and Sealed this

Twenty-eighth Day of October, 2003

JAMES E. ROGAN
*Director of the United States Patent and Trademark Office*